(12) United States Patent
Dao et al.

(10) Patent No.: US 10,815,624 B2
(45) Date of Patent: Oct. 27, 2020

(54) CONCRETE PAVEMENT STRUCTURE COMPRISING A CONCRETE BASE LAYER AND AN ELASTOMER IMPROVED CONCRETE WEARING LAYER

(71) Applicant: HOLCIM TECHNOLOGY LTD, Jona (CH)

(72) Inventors: Duc Tung Dao, Saint-Quentin Fallavier (FR); Mohsen Ech, Saint-Quentin Fallavier (FR); Nicolas Miravalls, Saint-Quentin Fallavier (FR); Eric Stora, Saint-Quentin Fallavier (FR)

(73) Assignee: HOLCIM TECHNOLOGY LTD, Jona (CH)

( * ) Notice: Subject to any disclaimer, the term of this patent is extended or adjusted under 35 U.S.C. 154(b) by 116 days.

(21) Appl. No.: 16/087,953

(22) PCT Filed: Mar. 23, 2017

(86) PCT No.: PCT/EP2017/056943
§ 371 (c)(1),
(2) Date: Sep. 24, 2018

(87) PCT Pub. No.: WO2017/162799
PCT Pub. Date: Sep. 28, 2017

(65) Prior Publication Data
US 2019/0177923 A1    Jun. 13, 2019

(30) Foreign Application Priority Data

Mar. 23, 2016   (EP) ..................................... 16305333

(51) Int. Cl.
| | | |
|---|---|---|
| *E01C 7/35* | (2006.01) | |
| *E01C 11/22* | (2006.01) | |
| *C04B 28/04* | (2006.01) | |

(52) U.S. Cl.
CPC ............ *E01C 7/358* (2013.01); *E01C 11/226* (2013.01); *C04B 28/04* (2013.01); *Y02A 30/32* (2018.01)

(58) Field of Classification Search
CPC ........ E01C 11/226; E01C 7/358; Y02A 30/32
See application file for complete search history.

(56) References Cited

U.S. PATENT DOCUMENTS

| 5,788,407 | A | | 8/1998 | Hwang | |
|---|---|---|---|---|---|
| 5,861,057 | A | * | 1/1999 | Berg | ................... C04B 24/2641 106/672 |

(Continued)

FOREIGN PATENT DOCUMENTS

| EP | 0 710 633 A1 | 5/1996 |
|---|---|---|
| EP | 2 083 121 A1 | 7/2009 |
| WO | WO 2012/001292 A1 | 1/2012 |

OTHER PUBLICATIONS

International Search Report as issued in International Patent Application No. PCT/EP2017/056943, dated Jun. 27, 2017.

(Continued)

*Primary Examiner* — Abigail A Risic
(74) *Attorney, Agent, or Firm* — Pillsbury Winthrop Shaw Pittman LLP (57) ABSTRACT

A concrete pavement structure includes a base layer directly coated by a wearing layer, wherein the base layer is a concrete base layer and the wearing layer is an elastomer modified pervious concrete layer, having a thickness below to 4 cm, a void content ranging from 5% to 20% in volume, and a maximal diameter of aggregates present in the polymer modified pervious concrete layer is 10 mm.

23 Claims, 4 Drawing Sheets

(56) References Cited

U.S. PATENT DOCUMENTS

| | | | |
|---|---|---|---|
| 2002/0110682 A1* | 8/2002 | Brogan | B29C 70/64 428/325 |
| 2007/0223998 A1* | 9/2007 | Hartenburg | E01C 7/30 404/31 |
| 2010/0112329 A1* | 5/2010 | Yi | C04B 28/02 428/312.4 |
| 2011/0230598 A1* | 9/2011 | Sorger | E01C 11/226 524/5 |

OTHER PUBLICATIONS

Friel, S., et al., "Use of Wehner Schulze to predict skid resistance of Irish surfacing materials," Airfield and Highway Pavement 2013: Sustainable and Efficient Pavements ® ASCE (2013), pp. 817-828.

* cited by examiner

CONCRETE PAVEMENT STRUCTURE COMPRISING A CONCRETE BASE LAYER AND AN ELASTOMER IMPROVED CONCRETE WEARING LAYER

CROSS-REFERENCE TO RELATED APPLICATIONS

This application is the U.S. National Stage of PCT/EP2017/056943 filed Mar. 23, 2017, which in turn claims priority to European patent application number 16305333.3 filed Mar. 23, 2016. The content of these applications are incorporated herein by reference in their entireties.

FIELD OF THE INVENTION

The invention relates to a concrete pavement structure.

BACKGROUND OF THE INVENTION

The current wearing courses of asphalt pavements offer flexibility, reactivity, and comfort for road users. The asphalt industry has been progressing over the last 20 years and is now able to offer a huge range of solutions addressing noise, roughness, drainage, void content, and safety.

Concrete pavements are generally less comfortable than asphalt pavements. Even if the development of new technologies has resulted in improved surface quality of concrete pavements, it is still very difficult to change this negative perception.

Furthermore, in many cases the initial construction costs of concrete pavements are higher than with asphalts pavements.

Some main historical obstacles to concrete pavements developments are:
 high initial price of the investment,
 perception of the end users in term of comfort, safety due to the problem of jointing and quality of the surface,
 hardening time and lack of flexibility increase the obsession on traffic organization for the road authorities, and industry awareness.

The concrete pavement may definitely become competitive with asphalt pavement. In fact, the wearing course of concrete pavement usually lasts over 15 to 20 years, where these of flexible ones are given for about 7-15 years. Thus, the rigid pavement is more durable and requires a lower cost for the maintenance during its service life than a flexible pavement.

In this context, there is a need in development of concrete pavement structure, which can offer:
 a durable complete solution with concrete structural capacity,
 expected standard (i.e. those defined for asphalt roads) in terms of comfort and safety, also for heavy loads and dense traffic, and
 technical innovations as color choices, easy placing.

Pervious concrete (also called porous concrete, permeable concrete) is a special type of concrete with a high void content notably used for concrete flatwork applications that allows water from precipitation and other sources to pass directly through, thereby reducing the runoff from a site and allowing groundwater recharge. Pervious concrete has just sufficient hydraulic binder that the individual grains of the aggregate are only bonded together at the contact sites by a thin hardened layer and after compaction the cavities between the individual grains are still not filled.

Pervious concrete is made using large aggregates with little to no fine aggregates. The concrete paste then coats the aggregates and allows water to pass through the concrete slab. Due to the very high void content, pervious concrete has a limited mechanical strength. Thus, pervious concrete is traditionally used in parking areas, areas with light traffic, residential streets, pedestrian walkways, and greenhouses.

The longevity of these pavement systems is limited owing to the formation of cracks and particle escape. In order to remedy these defects, pervious concrete is modified with polymer dispersions.

In pervious concrete layers, the use of polymers leads to an improvement in the freeze-thaw resistance, crack resistance and less particle escape, and thus increases the stability of the pervious concrete layer and its lifetime. What is decisive here is that the flexibility of the concrete matrix is sufficiently increased and thus crack formation and grain escape are minimized, which will improve the durability of the concrete pavement.

EP 2 083 121 discloses a porous concrete road surface made from polymer-modified cement. The structure consists of a bottom layer, a bonding course, a porous concrete layer and a surface treating layer. The top face of the porous concrete layer is coated by the surface treating layer. The polymer is present in bonding layer, in porous concrete layer and in surface treating layer. The structure has the disadvantage that a surface treatment layer is necessary to improve the wear of the pervious concrete layer and the skid resistance. This surface treatment layer is applied in the form of a polymer-modified mortar which can partly seal off the pores of the pervious concrete layer which has an adverse effect on the noise-absorbing properties and the drainage of the open-pore structure. In this scenario, on top of additional costs due higher polymer contents, its application requires an additional working step, which adversely affects the economics. Moreover, the roads disclosed in EP 2 083 121 are not suitable for heavy load and dense traffic, but are designed for parking areas, areas with light traffic, pedestrian walkways.

US2011/0230598 discloses a pervious concrete composition containing cement, filler and polymer, characterized in that a vinyl acetate ethylene copolymer with a glass transition temperature Tg of ≤20° C. is contained as the polymer. A bonding layer is used to assure the bonding of the pervious concrete layer on the base course. The structure of the base course is not disclosed.

The bending tensile strength of the concrete are ranged from 4.99 MPa to 7.01 MPa depending on the curing methods with a cavity volume about 24%. A higher strength and lower cavity volume would be better for the use as wearing course under the heavy traffic.

SUMMARY OF THE INVENTION

The invention is based on the development of a new concrete pavement structure composed of:
 a concrete base of undowelled pavement, jointed plain concrete pavement, jointed reinforced concrete pavement, continuously reinforced concrete pavement, or advantageously a low cost base layer such as Roller-Compacted Concrete or other low-cost slip-formed concrete, and
 an elastomer modified pervious concrete layer having a thickness between 2 and 4 cm.

The elastomer modified pervious concrete layer is a very high quality thin surface layer. This surface will then directly be in contact with the tires of the vehicles. It could thus also be called wearing layer.

The concrete base layer will advantageously be deposited on aggregates subbase(s), by well-known processes.

The purpose of this concrete pavement structure is to offer excellent ride quality and improved safety to the road users. Additional functionalities and benefits of this pavement structure are:

Efficient superficial water drainage,
Support of heavy loads and dense traffic,
High strength,
Durability,
Easy to place,
Cost effective both in total materials costs and costs related to building the road,
Noise reduction, and
Customizable colors.

In particular, the mechanical performances of the pavement structure are very good, both in terms of compressive, flexural and bonding strengths, with a high ratio of Flexural/Compressive strength.

The resulting road is in particular suitable for heavy load and dense traffic, such as highways.

DETAILED DESCRIPTION OF FIGURES

FIG. 1 is a representation of a road comprising the concrete pavement structure of the invention.
1: concrete pavement structure
2: elastomer modified pervious concrete layer
3: concrete base layer
4: subbase 2
5: subbase 1
6: subgrade FIG. 2 discloses the compressive strength (grey) and flexural resistance strength (black) for the mixes of the example
R=Reference—ADVA0.29% C1=0.145% ADVA-5% Etonis260
C2=0.145% ADVA-10% Etonis260 C3=0.217% ADVA-5% Etonis850
C4=0.217% ADVA-10% Etonis850 C5=0.145% ADVA-5% Primal CM 160
C6=0.07% ADVA-10% Primal CM 160 C7=0.145% ADVA-10% ChrysoCim FIG. 3 discloses the tensile strength (MPa) for the 4 tested scenarii (from left to right: REF/LAT without tack coat, reference/latex with a cement paste tack coat, reference/latex with a latex tack coat, reference/latex with segregation)
REF: without elastomer in pervious concrete layer
LAT: with elastomer in pervious concrete layer FIG. 4 discloses the mass loss (%) for mixes: R, C2 and C7 in the raveling test at 28 days R=Reference—ADVA0.29%; C2=0.145% ADVA-10% Etonis260; C7=0.145% ADVA-10% ChrysoCim FIG. 5 discloses the temperature (° C.) variation in function of time (hour) for 1 freeze-thaw cycle FIG. 6 discloses the mass loss in function of the number of freeze-thaw cycles for Hydromedia®, R, C7 and C2
× Hydromedia® ΔR==Reference—ADVA0.29%; □C7=0.145% ADVA—10% ChrysoCim ◇ C2=0.145% ADVA-10% Etonis2

DETAILED DESCRIPTION OF THE INVENTION

Figure 1:
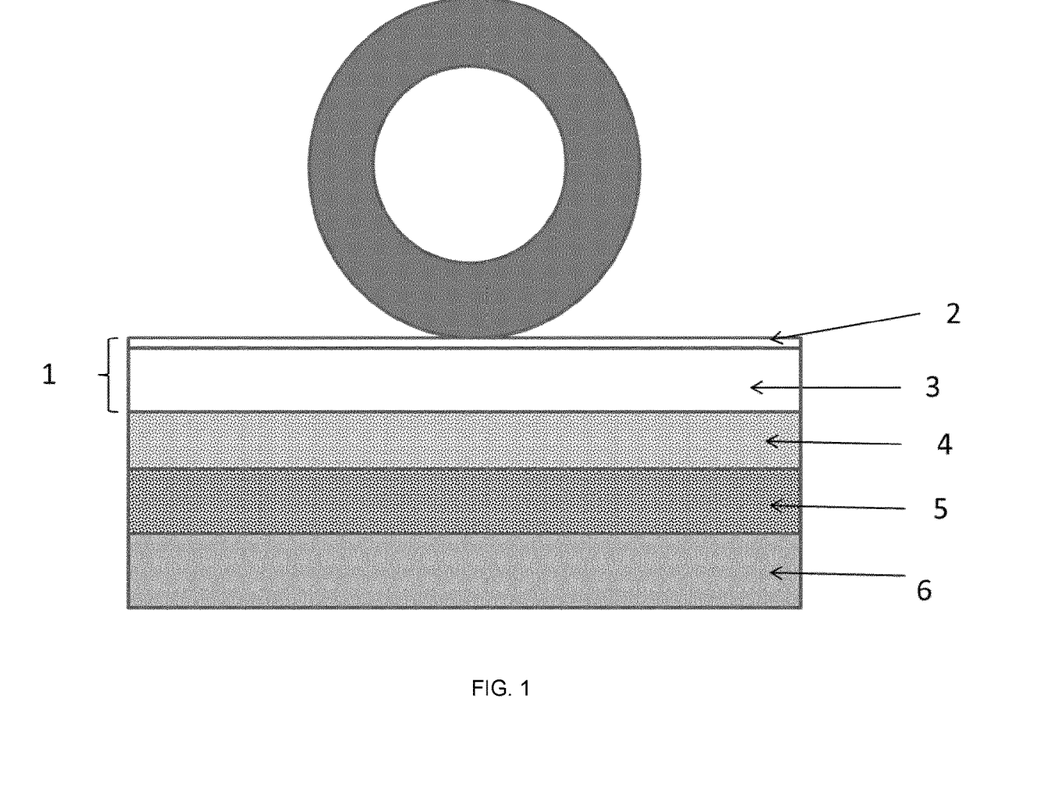

A subject of the invention is a concrete pavement structure 1 comprising a base layer 3 directly coated by a wearing layer 2, wherein the base layer 3 is a concrete base layer and the wearing layer 2 is an elastomer modified pervious concrete layer, having a thickness below to 4 cm, a hardened void content ranging from 5% to 20%, preferentially from 5% to 10%, in volume and the maximal diameter of the aggregates present in said polymer modified pervious concrete layer is 10 mm.

"directly coated" means that the concrete pavement structure does not comprise a bonding layer or a tack layer between the concrete base layer 3 and the wearing layer 2.

The terms "course" and "layer" will be used interchangeably.

The terms "wearing layer" or "wearing course" are interchangeably used to designate the elastomer modified pervious concrete layer of the invention.

Properties of the Concrete Pavement Structure 1:

The concrete base layer 3 directly coated by an elastomer modified pervious concrete layer 2 has good mechanical performance.

The combination of the invention allows manufacturing concrete roads which can support heavy load and dense traffic.

In the invention, the wearing course 2 is well bonded to the concrete subbase 3. Accordingly, the wearing course 2 can be as thin as possible. This notably allows the wearing layer 2 to advantageously work in compressive mode under the loading of vehicles because the tensile strength of concrete is much lower than the compressive strength. Less stress occurs in the thin course. The durability of the course is improved and the longevity of the concrete pavement structure 1 can thus be improved.

In addition, because of the economic reason, the thickness of this course is preferably not thicker than 4 cm. As a result, to respect these criteria, the Dmax of aggregate is less than 10 mm.

The concrete pavement structure 1 has good mechanical strength (as flexural, compressive, modulus . . . ) resulting in longer service life. The concrete pavement structure 1, especially the elastomer modified pervious concrete layer 2, is more durable than that of very thin asphalt concrete (BBTM in French) without raveling, rutting, scaling during its service life.

The wearing course 2 has a skid resistance comparable to BBTM, which confirm the safety of the concrete pavement structure 1. The drainable property of wearing course 2 helps to reduce the water splash and spray risks under rainy weather.

Figure 7:
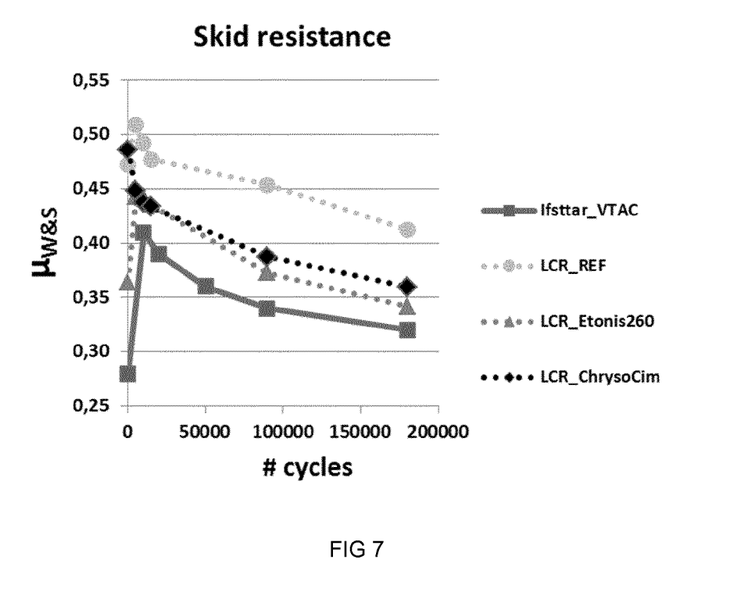
FIG. 7 discloses the $\mu_{W\&S}$ in function of the number of cycles for very thin asphalt concrete (BBTM in French) and elastomer modified pervious concrete □reference Ifsttar_VTAC ΔC2=0.145% ADVA-10% Etonis260
•R=Reference—ADVA0.29% ◇ C7=0.145% ADVA—10% ChrysoCim

The elastomer modified pervious concrete layer 2 has a friction coefficient, measured by Wehner & Schulze method, μWS, preferably above 0.32, at 180 000 polishing cycles. In particular, the μWS curves are presented in example. As can been noticed, the elastomer modified pervious concrete layer 2 has a friction coefficient similar to the one obtained with very thin asphalt concrete (BBTM in French).

Accordingly, the wearing layer 2 has good skid resistance, similar to the one obtained with very thin asphalt concrete (commercial reference).

In particular, the set concrete base layer 3 directly coated by an elastomer modified pervious concrete layer 2 has a compressive strength at 28 days above 20 MPa, advantageously above 25 MPa, more advantageously above 30 MPa. The compressive strength at 28 days, is preferably from 20 MPa to 50 MPa, advantageously from 25 MPa to 45 MPa, more advantageously from 30 MPa to 40 MPa.

In particular, the elastomer modified pervious concrete layer 2 has a compressive strength at 28 days above 20 MPa, advantageously above 25 MPa, more advantageously above 30 MPa. The compressive strength at 28 days is preferably from 20 MPa to 50 MPa, advantageously from 25 MPa to 45 MPa, more advantageously from 30 MPa to 40 MPa.

In particular, the set concrete base layer 3 directly coated by an elastomer modified pervious concrete layer 2 has a flexural strength at 28 days above 6 MPa, advantageously above 7 MPa, more advantageously above 8 MPa. The flexural strength at 28 days is preferably from 6 MPa to 15 MPa, advantageously from 7 MPa to 10 MPa, more advantageously from 8 MPa to 10 MPa.

In particular, the elastomer modified pervious concrete layer 2 has a compressive strength at 28 days above 6 MPa, advantageously above 7 MPa, more advantageously above 8 MPa. The compressive strength, at 28 days, is preferably from 6 MPa to 15 MPa, advantageously from 7 MPa to 10 MPa, more advantageously from 8 MPa to 10 MPa.

In particular, the set concrete base layer 3 directly coated by an elastomer modified pervious concrete layer 2 has (flexural resistance strength at 28 days)/(compressive strength at 28 days) ratio above 0.2, advantageously 0.35 or more. The ratio is preferably from 0.2 to 0.5, advantageously from 0.3 to 0.4.

In particular, the elastomer modified pervious concrete layer 2 has (flexural resistance strength at 28 days)/(compressive strength at 28 days) ratio above 0.2, advantageously 0.35 or more. The ratio is preferably from 0.2 to 0.5, advantageously from 0.3 to 0.4

The bonding strength between the two layers 2, 3 is good. The invention does not require the need of a bonding layer or a tack layer between the concrete base layer 3 and the elastomer modified pervious concrete layer 2. This reduces the total cost of the road.

The tensile bond strength between concrete base layer 3 and elastomer modified pervious concrete layer 2 is advantageously above 2 MPa, more advantageously above 3 MPa. The tensile bond strength between concrete base layer 3 and elastomer modified pervious concrete layer 2 is advantageously from 2 MPa to 4 MPa, more advantageously from 3 MPa to 4 MPa.

Such good tensile bond strengths can notably be obtained by using a wet-on-wet process, id est the elastomer modified pervious concrete layer 2 is poured and placed before the final setting time of the concrete base layer 3, or less preferentially a wet-on-dry process, id est the elastomer modified pervious concrete layer 2 is poured and placed after the final setting time of the concrete base layer 3.

Accordingly, the concrete pavement structure 1 does not comprise a layer (bonding layer, tack layer, etc.) between the base layer 3 and the elastomer modified pervious concrete layer 2.

To assure efficient superficial water drainage, the void content of the polymer modified pervious concrete ranges advantageously from 5% to 20%, preferentially from 5% to 10%, in volume.

The concrete pavement 1 of the invention provides the following advantages:

a good mechanical performance with a high ratio of Flexural/Compressive strength,
a better scaling resistance versus conventional pervious concrete,
a better raveling resistance,
a good bonding strength to the subbase concrete without a tack coat,
a good skid resistance,
a good capacity of drainage, and
a large range of aesthetic choice.

The concrete pavement 1 is composed of:
a concrete base layer 3, preferably a low cost base layer such as Roller-Compacted Concrete or other low-cost slip-formed concrete, and
an elastomer modified pervious concrete layer 2.

These layers are disclosed in more details in the following.

Detailed Description of the Elastomer Modified Pervious Concrete Layer 2

The elastomer modified pervious concrete layer is a very high quality thin surface layer.

The thickness of the elastomer modified pervious concrete layer advantageously ranges from 2 cm to 4 cm.

Such a thickness requires that the maximal diameter of the aggregates present in this layer is below 10 mm.

Advantageously, the polymer modified pervious concrete comprises, by $m^3$ of fresh pervious concrete:
From 220 to 380 kg, advantageously from 255 to 380 kg, more advantageously from 350 to 380 kg, of a hydraulic binder;
From 86 to 148 liters of water, the mass ratio weight of water/weight of hydraulic binder ranging from 0.3 to 0.5;
From 1210 to 1720 kg of coarse aggregates having a diameter from 1.6 mm to 10 mm;
From 30 to 520 kg of crushed or natural fine aggregate having a diameter from 0 mm to 2 mm;
Wherein all aggregates have maximal diameter, Dmax, equal or below 10 mm;
An elastomer.

The mass ratio weight of water/weight of hydraulic binder advantageously ranges from 0.35 to 0.45, more advantageously is 0.4.

The aggregates include calcareous, siliceous, and silico-calcareous materials. They include natural, artificial, waste and recycled materials. The aggregates may also comprise, for example, wood.

Advantageously, coarse aggregates having a diameter from 1.6 mm to 10 mm and crushed or natural fine aggregate having a diameter from 0 mm to 2 mm constitute from 80% to 100%, advantageously from 90% to 100%, more advantageously 100%, by mass of all the aggregates.

Advantageously, coarse aggregates have a diameter from 1.6 mm to 6 mm, more advantageously from 1.6 mm to 4 mm.

Advantageously, the coarse aggregates have a stiffness, characterized by the coefficient of PSV higher than 50.

Advantageously, natural or crushed fine aggregate has a diameter from 0 mm to 0.6 mm, more advantageously from 0 mm to 0.4 mm.

Advantageously, the polymer modified pervious concrete comprises a superplasticizer, advantageously in content from 0% to 5% by weight, more advantageously from 0.1% to 2% by weight, on the basis of the hydraulic binder weight.

The term superplasticizer as used in this specification and the accompanying claims is to be understood as including both water reducers and superplasticizers as described in the Concrete Admixtures Handbook, Properties Science and Technology, V.S. Ramachandran, Noyes Publications, 1984.

A water reducer is defined as an additive which reduces the amount of mixing water of concrete for a given workability by typically 10-15%. Water reducers include, for example lignosulphonates, hydroxycarboxylic acids, carbohydrates, and other specialized organic compounds, for example glycerol, polyvinyl alcohol, sodium alumino-methyl-siliconate, sulfanilic acid and casein.

Superplasticizers belong to a new class of water reducers which are chemically different to older water reducers and capable of reducing water contents by about 30%. The superplasticizers have been broadly classified into four groups: sulphonated naphthalene formaldehyde condensate (SNF) (generally a sodium salt); sulphonated melamine formaldehyde condensate (SMF); modified lignosulfonates (MLS); and others. More recent superplasticizers include polycarboxylic compounds such as polycarboxylates, e.g. polyacrylates. The superplasticizer is preferably a new generation superplasticizer, for example a copolymer containing polyethylene glycol as graft chain and carboxylic functions in the main chain such as a polycarboxylic ether. Sodium polycarboxylate-polysulphonates and sodium polyacrylates may also be used. Phosphonic acid derivatives may also be used. The amount of superplasticizer required generally depends on the reactivity of the cement. In order to reduce the total alkali content the superplasticizer may be used as a calcium rather than a sodium salt.

Phosphonic acid derivatives may also be used. Sodium polycarboxylate-polysulphonates and sodium polyacrylates may also be used. The amount of superplasticizer required generally depends on the reactivity of the cement. In order to reduce the total alkali content the superplasticizer may be used as a calcium rather than a sodium salt. Other additives may be included in the composition according to the invention, for example, a defoaming agent (e.g. polydimethylsiloxane). These also include silicones in the form of a solution, a solid or preferably in the form of a resin, an oil or an emulsion, preferably in water. More particularly suitable are silicones comprising (RSiO0.5) and (R2SiO) moieties. In these formulae, the R radicals, which may be the same or different, are preferably hydrogen or an alkyl group of 1 to 8 carbon atoms, the methyl group being preferred. The number of moieties is preferably from 30 to 120.

For practical reasons, the elastomer is advantageously added under the form of a latex, id est a water emulsion comprising the elastomer. The elastomer could also be introduced under powder form.

The elastomer is advantageously styrene butadiene rubber emulsion, neoprene emulsion, acrylic acid emulsion, acrylate emulsion, styrene-acrylate emulsion, vinyl acetate-ethylene emulsion, acrylate-ethylene-vinyl ester emulsion, or mixture or two or more of these emulsions. The elastomer can also be a powder of vinyl acetate-ethylene.

Advantageously, the elastomer is a copolymer of vinyl acetate-ethylene-(meth)acrylic acid esters, preferably under the latex form.

The elastomer content preferably ranges from 1% to 20% by weight, preferably 3% to 15% by weight, compared to the total weight of hydraulic binder. When elastomer is used in the form of latex, the content thereof is calculated on the basis of the dry weight of the elastomer.

The polymer modified pervious concrete advantageously comprises 160 to 260 liters, more advantageously comprises 190 to 260 liters, even more advantageously comprises 230 to 260 liters, for example 230 liters, of mix hydraulic binder and water, by $m^3$ of fresh pervious concrete.

A hydraulic binder is a material which sets and hardens by hydration, for example a cement, in particular Portland cement, sulfo-aluminate cement, belitic cement, sulfo-belitic cement and their mixtures.

Portland cement is a clinker as defined in the norm NF EN 197-1, February 2001. Portland clinker is obtained by clinkering at high temperature a mixture comprising limestone and, for example, clay.

Portland cement, or other cements, can be mixed with mineral additions. In an embodiment, the hydraulic binder is any ordinary Portland cement, CEM I, CEM II, CEM III, CEM IV, or CEM V as defined in the cement standard EN 197-1, February 2001.

Mineral additions are, for example, slags (for example as defined in the "cement" standard NF EN 197-1 standard of February 2001, paragraph 5.2.2), pozzolans (for example as defined in the "cement" standard NF EN 197-1 standard of February 2001, paragraph 5.2.3), fly ash (for example as defined by the "cement" NF EN 197-1 standard of February 2001, paragraph 5.2.4), calcined shales (for example as defined by the "cement" NF EN 197-1 standard of February 2001, paragraph 5.2.5), calcium carbonate (for example limestone as defined by the "cement" NF EN 197-1 standard of February 2001, paragraph 5.2.6), silica fume (for example as defined by the "cement" NF EN 197-1 standard of February 2001, paragraph 5.2.7), metakaolin or mixtures thereof.

The polymer modified pervious concrete is advantageously compacted, for example with a vibrating hammer.

The polymer modified pervious concrete can comprise further additives, in particular pigments when a colored course is wanted.

This wearing course aims to offer a thin interface between the structural function and the user perception. It will allow road management authorities to benefit from concrete economics of a rigid pavement:
- equivalent costs at construction level,
- no structural maintenance over the life time, (only surface maintenance, to be assessed).

Detailed Description of Concrete Base Layer 3

The concrete base layer can be any kind of concrete layer, in particular undowelled pavement, jointed plain concrete pavement, jointed reinforced concrete pavement, continuously reinforced concrete pavement, or advantageously a low cost base layer such as Roller-Compacted Concrete or other low-cost slip-formed concrete.

Low cost base layer such as Roller-Compacted Concrete or other low-cost slip-formed concrete are preferred, for evident cost reasons.

In particular, the concrete base layer does not need to be porous.

As an illustrative embodiment, the concrete base layer comprises, by $m^3$ of fresh pervious concrete
- From 250 to 380 kg, advantageously 300 to 380 kg, more advantageously from 330 to 380 kg, of a hydraulic binder;
- From 87 to 171 liters, advantageously from 100 to 152 liters, more advantageously from 87 to 133 liters, of water, the mass ratio weight of water/weight of hydraulic binder ranging from 0.35 to 0.45;
- From 800 to 1400 kg, advantageously from 800 to 1000 kg, of coarse aggregates having a diameter from 10 mm to 32 mm;
- From 200 kg to 600 kg, more advantageously from 200 to 400 kg, of coarse aggregated having a diameter from 6 mm to 10 mm, From 600 to 1200 kg, advantageously from 800 to 1000 kg, of fine aggregates having a diameter from 0 mm to 6 mm, Manufacturing Process:

A subject of the invention is also a process for manufacturing a concrete pavement structure 1 of the invention, wherein the elastomer modified pervious concrete layer is directly deposited on the concrete base layer before the hardening of said concrete base layer.

Accordingly, the process does not require including an additional layer to improve the bonding between the concrete base layer and the elastomer modified pervious concrete layer. The preferred method of construction is what is called "wet-on-wet": the elastomer modified pervious concrete layer 2 is poured and placed before the final setting time of the concrete base layer 3.

In a preferred embodiment, a concrete base layer is deposited following traditional methods. The road may have been prepared with one or many subbase layers (mainly aggregates). Subbase layers (5, 6) are typically made of a recipe of mixing different sizes of crushed rock together forming the aggregate. An aggregate is normally made from newly quarried rock, or it is sometimes allowed to be made from recycled asphalt concrete and/or Portland cement concrete.

After deposition of the concrete base layer 3, but before final setting, the elastomer modified pervious concrete layer 2 is poured and placed on the concrete base layer 3. This process is called wet-wet process and allows good bonding strength.

The principle of this method is placing a relatively thin, high-quality concrete surface immediately on top of a lower concrete layer when it is still plastic. For a good bonding to lower layer it is recommended to place the upper layer within 15 to 90 minutes (ideally within 60 minutes) of the lower concrete layer.

The concrete layers 2, 3 can be dried cured; meaning that curing compound, plastic sheet may not be required. The hydraulic reaction of the binder does not require heat, catalyst of UV treatments.

The layers can easily be colored, by well-known processes.

Negative roughness of the top surface, enabling road comfort and safety, is achieved by using well known processes of placement such as a compaction made by a slippery device (roller, cylinder metal tube . . . ).

In addition to the properties already disclosed, the concrete pavement structure of the invention is environment friendly (the use of additional chemicals is overall reduced) and gives a large aesthetic choice to authorities.

The noise reduction is comparable to that of very thin asphalt concrete (BBTM).

In term of costs, it is competitive with asphalt concrete.

A subject of the invention is also a road comprising the concrete pavement structure 1 of the invention.

This road is especially for vehicles traffic, including heavy load and dense traffic. In particular, the road is a highway.

A further subject of the invention is use of an elastomer in an elastomer modified pervious concrete layer to improve skid resistance of the pervious concrete layer.

The elastomer and elastomer modified pervious concrete layer are as disclosed above.

Figure 5:
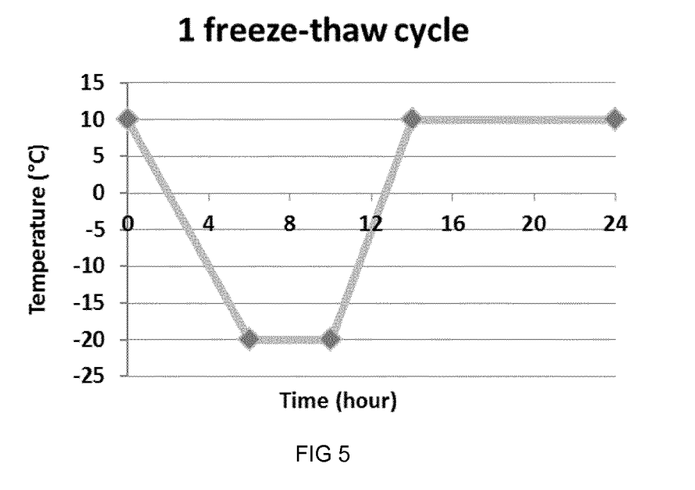

In this specification including the accompanying claims:
flexural strength values are measured after dry curing for seven days at 20° C., at 50% of relative humidity on prism-shaped test samples having a width of 4 cm and a height of 7 cm and a length of 16 cm; supported at two points, force being applied in the middle; the force applied to the sample is increased at a rate of 0.05 kN/sec during testing,
percentages, unless otherwise specified, are by weight,
bonding strength is measured by NF EN 1542 standard published in 1999,
scaling is determined by the continuously follow-up of mass loss of cubic test samples of 10*10*10 cm which are immerged in a salt-water of 3% of NaCl during the free-thaw cycles according to the FIG. 5,
raveling is determined by the ASTM C1747/C1747M-13 standard published in 2013, and
skid-resistance is determined by the Wehner & Schulze test described in the NF EN 12697-49 standard published in 2014.

Method for Measuring the Void Content of Pervious Concrete Element

The voids contend in the pervious concrete is computed from the weight and apparent volume of compacted concrete.

EXAMPLES

In examples, materials are available to the following providers:

| | |
|---|---|
| CEM I 52.5 | LafargeHolcim, « Saint Pierre la Cour » |
| Coarse aggregates 1.6/3 | LafargeHolcim, Cassis site (France) |
| Fine aggregate 0/0.312 | LafargeHolcim, Fulchiron site (France) |
| Superplasticizer ADVA ® Flow 450 | Grace Construction Products |
| Latex Etonis ® 260 | Wacker Polymers |
| Powder Etonis ® 850 | Wacker Polymers |
| Latex Primal ® CM 160 | Dow construction chemicals |
| Latex ChrysoCim ® | Chryso |

The different families of latex used are:

TABLE 1

| Name | Chemical | Used in mixes |
|---|---|---|
| Etonis ® 260 | Acrylic acid ester + ethylene + vinyl esters + water | C1, C2 |
| Etonis ® 850 | Vinyl acetate/ethylene copolymer (powder) | C3, C4 |
| Primal ® CM 160 | Acrylic emulsion polymer | C5, C6 |
| ChrysoCim ® | Styrene butadiene emulsion | C7 |

The following concrete mixtures are used for testing:

Wearing course:

TABLE 2

| Mix | Aggregates 1.6/3 (kg/m3) | Crushed sand 0/0.312 (kg/m3) | CEM I (kg/m3) | Super-plasticizer | Elastomer | w/c | Free water (L) | Void content (by volume) |
|---|---|---|---|---|---|---|---|---|
| R  | 1675 | 104 | 305 | 3.0 | 0.0  | 0.4 | 121.9 | 17% |
| C1 | 1650 | 103 | 302 | 1.5 | 27.2 | 0.4 | 120.4 | 21% |
| C2 | 1650 | 103 | 286 | 1.4 | 51.5 | 0.4 | 114.0 | 18% |
| C3 | 1650 | 103 | 284 | 2.1 | 14.2 | 0.4 | 113.3 | 21% |
| C4 | 1650 | 103 | 255 | 1.9 | 25.5 | 0.4 | 101.8 | 19% |
| C5 | 1650 | 103 | 301 | 1.5 | 30.1 | 0.4 | 120.1 | 16% |
| C6 | 1650 | 103 | 284 | 0.7 | 56.9 | 0.4 | 113.5 | 21% |
| C7 | 1650 | 103 | 283 | 0.0 | 61.5 | 0.4 | 112.8 | 20% |

For all, the volume of paste is 230 L/m$^3$

The concrete is, in any case, compacted by vibrating hammer.

The concrete is, in any case, cured by dried curing at 50% HR at 20° C.

Base Course:

| | |
|---|---|
| CEM I 52.5 | LafargeHolcim, « Saint Pierre la Cour » |
| Coarse aggregates 11/22 | LafargeHolcim, Cassis site (France) |
| Coarse aggregates 6/10 | LafargeHolcim, Cassis site (France) |
| Fine aggregates 0/5 | LafargeHolcim, St Bonnet site (France) |

| Mix | Coarse aggregates 11/22 (kg/m³)° | Coarse aggregates 6/10 (kg/m³) | Fine aggregates 0/5 (kg/m³) | CEM I (kg/m³) | w/c | Free water (liter) |
|---|---|---|---|---|---|---|
| RCC | 1124.6 | 265.7 | 714.8 | 250 | 0.4 | 100 |

Manufacturing Process of Concrete Pavement:

The concrete is, in any case, compacted by vibrating hammer.

The concrete is, in any case, cured by dried curing at 50% HR at 20° C.

Results:

Mechanical Strengths of the Wearing Course

Figure 2:
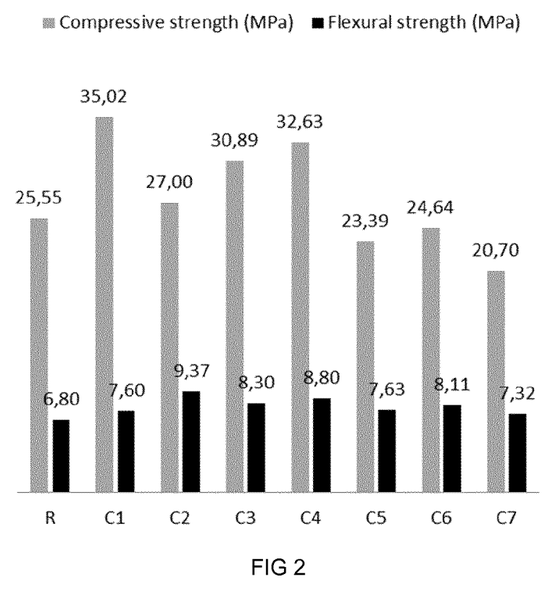

The results are provided in FIG. 2. The latex help to improve flexural strength (up to 40%). The wearing course of the invention fulfills the requirement of SETRA (Service d'Etudes sur les Transports, les Routes et leurs Amenagements, French institution for roads) which requires 3.3 MPa of splitting tensile strength.

Bonding Strength

The bonding strength to concrete base layer with 4 wet on wet scenario is compared:

Without tack coat

With a cement paste tack coat

With a latex tack coat

With segregation

Figure 3:
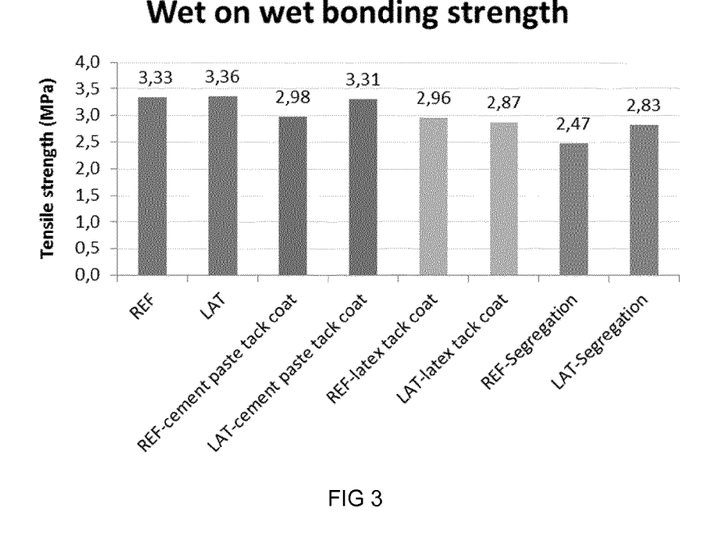

The results are provided in FIG. 3

REF: without elastomer in pervious concrete layer

LAT: with elastomer in pervious concrete layer

The best results are obtained without tack coat.

The tensile bond strength is very good, and there is no need to add a tack coat (or a bonding layer) between the concrete base layer and the elastomer pervious concrete layer.

Raveling at 28 Days

Figure 4:
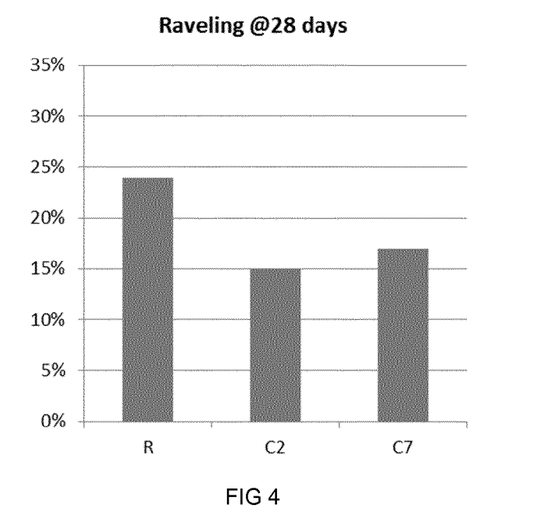

The results are provided in FIG. 4. The addition of latex improved significantly the raveling resistance of pervious concrete.

In comparison to Hydromedia® (Vpaste=160 L, W/C=0.34, disclosed in WO2012/001292) the raveling is improved.

Scaling (Cold Weather Condition)

The freeze thaw cycle is disclosed in FIG. 5. The results are provided in FIG. 6

Figure 6:
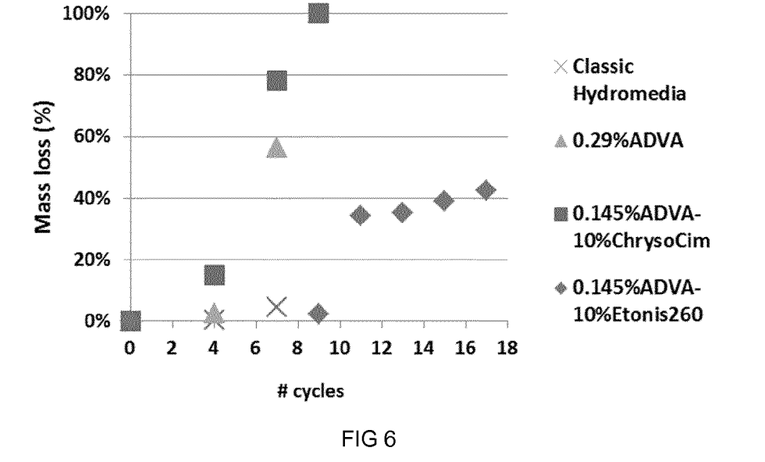

The addition of latex improved significantly the scaling resistance of pervious concrete.

In comparison to Hydromedia® (Vpaste=160L, w/c=0.34, disclosed in WO2012/001292) the scaling is improved.

Skid Resistance

The results are provided in FIG. 7

The wearing layer of the invention has been compared to a very thin asphalt layer, described in the paper of Friel et al. ("Use of Wehner Schulze to predict skid resistance of Irish surfacing materials", Shaun FRIEL, Malal Kane, David WOODWARD). In FIG. 7, this reference is called "Ifst-tar_VTAC"

The skid resistances are comparable.

The addition of latex increased skid resistance.

The invention claimed is:

1. A concrete pavement structure comprising a base layer directly coated by a wearing layer, wherein the base layer is a concrete base layer and the wearing layer is an elastomer modified pervious concrete layer, having a thickness less than 4 cm, a void content ranging from 5% to 20% in volume, and a maximal diameter of aggregates present in said elastomer modified pervious concrete layer is 10 mm.

2. The concrete pavement structure of claim 1, wherein the elastomer modified pervious concrete layer has a friction coefficient, measured by Wehner & Schulze method, µWS, above 0.32, at 180,000 polishing cycles.

3. The concrete pavement structure of claim 1, wherein the concrete base layer is an undowelled pavement, jointed plain concrete pavement, jointed reinforced concrete pavement, continuously reinforced concrete pavement, or a low cost base layer.

4. The concrete pavement structure of claim 1, wherein the concrete base layer directly coated by the elastomer modified pervious concrete layer has compressive strength, at 28 days, above 20 MPa.

5. The concrete pavement structure of claim 1, wherein the set concrete base layer directly coated by the elastomer modified pervious concrete layer has flexural resistance strength, at 28 days, above 8 MPa.

6. The concrete pavement structure of claim 1, wherein the tensile bond strength between concrete base layer and elastomer modified pervious concrete layer is above 2.5 MPa.

7. The concrete pavement structure of claim 1, wherein the void content of the elastomer modified pervious concrete ranges from 5% to 10%, in volume.

8. The concrete pavement structure of claim 1, wherein the elastomer modified pervious concrete comprises, by $m^3$ of fresh pervious concrete
- from 220 to 380 kg of a hydraulic binder;
- from 86 to 148 liters of water, the mass ratio weight of water/weight of hydraulic binder ranging from 0.3 to 0.5;
- from 1210 to 1720 kg of coarse aggregates having a diameter from 1.6 mm to 10 mm;
- from 30 to 520 kg of crushed or natural fine aggregate having a diameter from 0 mm to 2 mm;
- wherein all aggregates have maximal diameter, Dmax, equal or below 10 mm; and
- an elastomer.

9. The concrete pavement structure of claim 1, wherein, in the elastomer modified pervious concrete, coarse aggregates having a diameter from 1 mm to 10 mm and crushed sand having a diameter from 0 mm to 1 mm constitute from 80% to 100% by mass of all the aggregates.

10. The concrete pavement structure of claim 1, wherein the elastomer modified pervious concrete comprises a superplasticizer.

11. The concrete pavement structure of claim 1, wherein the elastomer is introduced under the form of a latex.

12. The concrete pavement structure of claim 10, wherein the elastomer is a copolymer of vinyl acetate-ethylene-(meth)acrylic acid esters.

13. The concrete pavement structure of claim 1, wherein, in the elastomer modified pervious concrete, the hydraulic binder is any ordinary Portland cement, CEM I, CEM II, CEM III, CEM IV, or CEM V as defined in the cement standard EN 197-1.

14. The concrete pavement structure of claim 1, wherein the concrete base layer is a roller compacted concrete.

15. A process for manufacturing a concrete pavement structure of claim 1, comprising directly depositing the elastomer modified pervious concrete layer on the concrete base layer before the hardening of said concrete base layer.

16. A road comprising the concrete pavement structure of claim 1.

17. A method for improving skid resistance of a pervious concrete layer comprising using an elastomer present in the pervious concrete layer and forming the elastomer modified pervious concrete layer in the concrete pavement structure of claim 1.

18. The concrete pavement structure of claim 1, wherein the low cost base layer is a Roller-Compacted Concrete or other low-cost slip-formed concrete.

19. The concrete pavement structure of claim 8, wherein the elastomer modified pervious concrete comprises, by $m^3$ of fresh pervious concrete from 350 to 380 kg of a hydraulic binder.

20. The concrete pavement structure of claim 9, wherein, in the elastomer modified pervious concrete, coarse aggregates having a diameter from 1 mm to 10 mm and crushed sand having a diameter from 0 mm to 1 mm constitute from 90% to 100% by mass of all the aggregates.

21. The concrete pavement structure of claim 10, wherein the elastomer modified pervious concrete comprises a superplasticizer in content up to 5% by weight, on the basis of the hydraulic binder weight.

22. The concrete pavement structure of claim 11, wherein latex is styrene butadiene rubber emulsion, neoprene emulsion, acrylic acid emulsion, acrylate emulsion, styrene-acrylate emulsion, vinyl acetate-ethylene emulsion, acrylate-ethylene-vinyl ester emulsion, or mixture or two or more of said emulsions.

23. The road of claim 16, wherein the road is a highway.

* * * * *